(No Model.)

A. C. VAUGHAN.
NUT LOCK.

No. 431,296. Patented July 1, 1890.

WITNESSES:
W. R. Davis
C. Sedgwick

INVENTOR:
A. C. Vaughan
BY Munn & Co.
ATTORNEYS

UNITED STATES PATENT OFFICE.

AARON C. VAUGHAN, OF SHANE'S CROSSING, OHIO.

NUT-LOCK.

SPECIFICATION forming part of Letters Patent No. 431,296, dated July 1, 1890.

Application filed November 14, 1889. Serial No. 330,307. (No model.)

*To all whom it may concern:*

Be it known that I, AARON C. VAUGHAN, of Shane's Crossing, in the county of Mercer and State of Ohio, have invented a new and Improved Nut-Lock, of which the following is a full, clear, and exact description.

My invention relates especially to that class of nut-locks used in railway construction, although it may be used wherever a nut is likely to become loosened by jar or wear; and the object of my invention is to provide a nut-lock that can be cheaply made, quickly and easily applied, and that shall be durable, efficient, and applicable to either wood or metal work.

To this end my invention consists of a single piece of malleable metal that may be fastened to either wood or metal, having a central opening somewhat in the form of a round washer that incloses the bolt, and a rim cut from the perimeter of the washer and curved outwardly, so as to stand free and clear from the body of the washer and encircle the nut, and which is adapted to be crushed or pressed against one of the faces of the nut with a movement parallel with the face of the washer, so as to bear against one of the faces of the nut and lock the same against turning. This construction will be hereinafter fully described, and specifically pointed out in the claims.

Reference is to be had to the accompanying drawings, forming a part of this specification, in which similar letters of reference indicate corresponding parts in all the figures.

Figure 1:
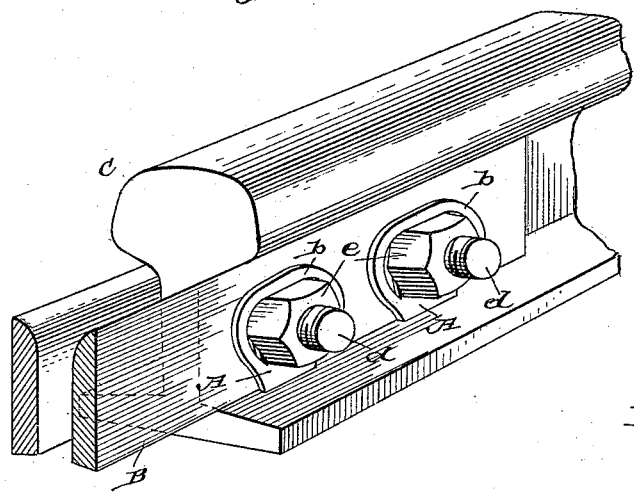
Figure 2:
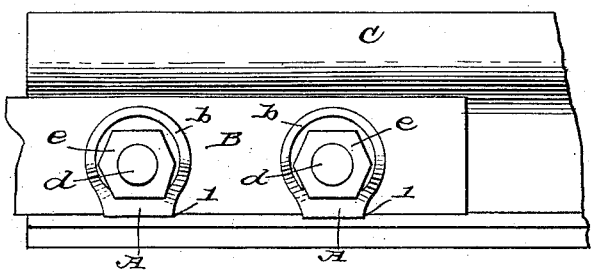
Figure 3:
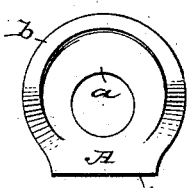
Figure 4:
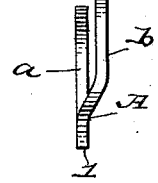
Figure 5:
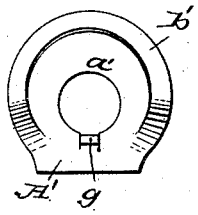
Figure 6:
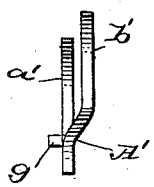
Figure 7:
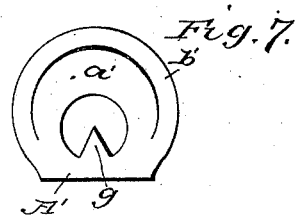

Figure 1 is a perspective view of the nut-lock as applied to the nuts of a railroad fish-plate, showing the nuts locked. Fig. 2 is a front elevation of the same, but with the nuts unlocked. Fig. 3 is a plan of the nut-lock; Fig. 4, a side elevation of the same. Figs. 5 and 6 are plan and side elevations of a modification of the device shown in Figs. 3 and 4; and Fig. 7, a plan view showing the manner in which the spur is formed on the inside of the washer.

The nut-lock A is flattened upon one side, as at *l*, and is provided with a central annular ring *a* and an outwardly and upwardly curved rim *b*. The ring or body *a* of the washer is flat and rests upon the surface of the parts secured by the bolt and nut. It surrounds the bolt and the nut rests upon it, while the rim *b* extends outward around the nut. For instance, in the drawings the washer *a* surrounds the bolt *d* and rests against the fish-plate B, which is attached to the rail C by the bolts *d* and nuts *e*. When the nut *e* is tightened, it will be drawn up against the washer *a*, the flattened part *l* of the nut-lock A will rest upon the bed-plate of the rail C and prevent the nut-lock from turning, and the rim *b* will surround the nut *e*, as shown in Fig. 2. The rim *b* is then flattened down upon the upper face of the nut, as shown in Fig. 1, thus preventing it from turning. This may be done with a hammer or other suitable tool. The nut-lock is made sufficiently large, so that when the rim *b* is sheared from the perimeter of the washer *a* there will be sufficient room for a square or hexagonal nut to turn within the rim *b* without striking at the corners. This construction will leave the body of the washer *a* large enough to afford a good bearing surface for the nut. As the nut-lock A is made of malleable metal, when the top of the rim *b* is crushed down the sides will expand and the nut-lock will not be materially injured. To remove nut *e* from a bolt *d*, a wrench is applied to the nut, and by using considerable strength the corners of the nut striking against the rim *b* will strengthen it out into nearly its original shape, and it may be used again.

The nut-lock A' (shown in Figs. 5, 6, and 7) is similar in shape to the nut-lock A, already described, the only difference being that the former is provided with a downwardly-projecting spur *g*, which is formed down from the body of the nut-lock A' in the inner edge of the ring *a'*, it being integral with the rest of the nut-lock. By making it in this way it can be stamped out at the same operation that stamps the nut-lock, thus making the nut-lock A' as cheap as the nut-lock A. This style of nut is specially applicable to wood-work, or to work where there is no bearing for the flattened portion *l*. In use, when a nut begins to bear upon the ring *a'*, the spur *g* is forced into the wood, thus preventing the nut-lock A' from turning with the nut, and when the nut is drawn up tightly the rim *b'* is crushed down in the manner described.

When this style of nut-lock is used in metal work, a hole should be chipped in the surface of the metal, or rather in or along the edge of the bolt-hole, this hole being chipped or punched when the bolt-hole is made, to receive the spur $g$ and prevent the nut-lock from turning. With this style of nut the flattened portion $l$ is unnecessary, and the outer periphery of the nut-lock may be round or of any desired shape. The spur $g$ may also be dispensed with, a slot cut in the inside edges of the washer $a$, and the washer keyed to the metal upon which it rests by driving a key through the slot in the edge of the washer and into a slot in the edge of the bolt-hole; or if the washer rests upon wood it may be perforated and attached to the wood by a brad driven through the perforation and into the wood.

It will be observed that my invention answers the double purpose of nut-lock and washer.

In defining my invention with greater clearness with reference to the prior state of the art, I would state that I am aware that a washer has been made with an offset outer portion in the shape of a spring-rim, which was adapted to bear against the edge of the nut to lock it. In one case such spring-rim had a serrated inner edge to lock against the corners of the nut, and in another the spring-rim was square to fit the square of the nut. In both cases such spring has to be pressed back by a tool while the nut is being turned off by a wrench, and said tool is in the way of the movement of the wrench. My invention is distinctive in that the offsetting rim has no spring action whatever, but is made thick and of the softest iron, and is swaged to contact with one of the faces of the nut by a movement parallel with the face of the washer. This rim is also made circular and perfectly smooth on its inner perimeter, so that the nut turns easily inside the same, and when the nut is turned up to solid bearing against the fish-plate or other surface, it matters not in what position the nut stops, the plain rim can be mashed down against the same, either from the middle of the top portion or upon either side of the same, which is not the case where an exact registration with a square fixed spring-rim is used. While, therefore, my nut-lock is applicable to all shapes and sizes of nuts and effectively locks them all, it is also very simply and cheaply made from common soft metal by a single inexpensive punching operation.

Having thus described my invention, what I claim as new, and desire to secure by Letters Patent, is—

1. A nut-lock consisting of a washer made of malleable metal, having a bearing for preventing it from turning on the surface to which it is applied, and having a curved peripheral rim stamped from and integral with the washer and offset outwardly from its plane, the said curved rim being smooth upon its inner periphery and adapted to be mashed at any point to contact with one of the faces of the nut by a movement parallel to the plane of the washer, substantially as described.

2. A nut-lock consisting of a washer made of malleable metal, having an inturned projection to prevent it from turning on the surface to which it is applied, and having a curved peripheral rim stamped from and integral with the washer and offset outwardly from its plane, the said curved rim being smooth upon its inner periphery and adapted to be mashed at any point to contact with one of the faces of the nut by a movement parallel to the plane of the washer, substantially as described.

AARON C. VAUGHAN.

Witnesses:
WARREN B. HUTCHINSON,
C. SEDGWICK.